April 11, 1967    J. E. WALDRUM ETAL    3,313,489
ROTATING LAWN SPRAYER NOZZLE HAVING DEPENDING
CYLINDRICAL DEFLECTING SURFACES
Filed March 5, 1965
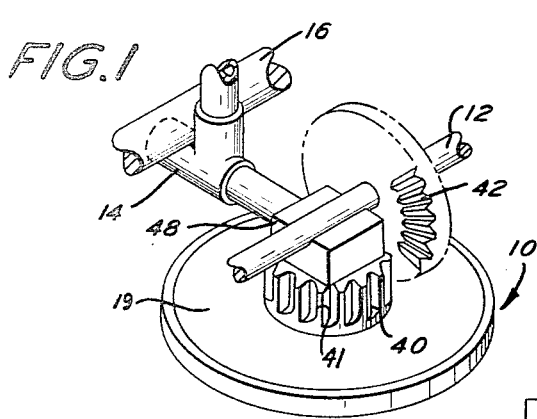
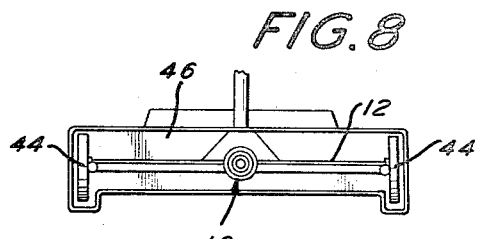
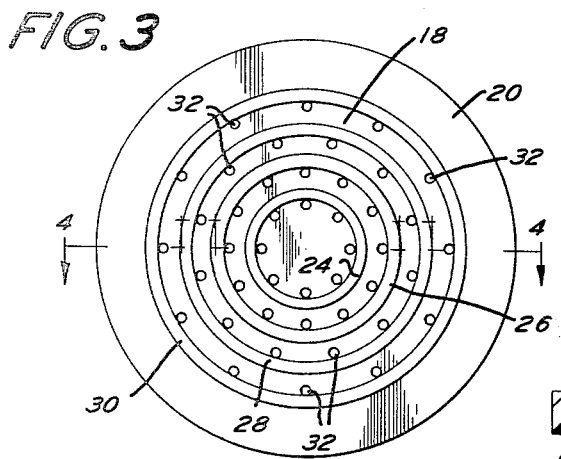
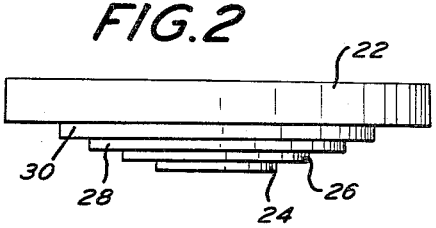
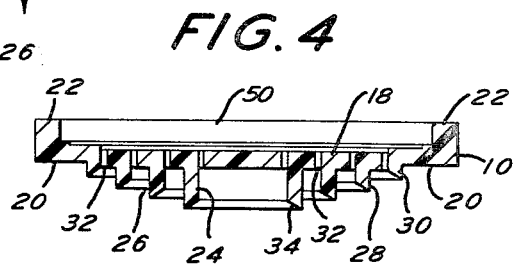
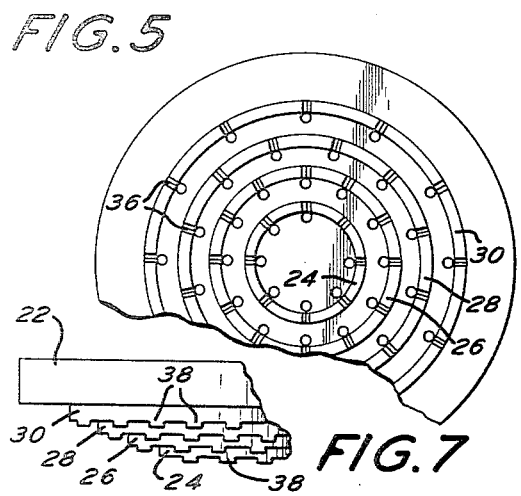
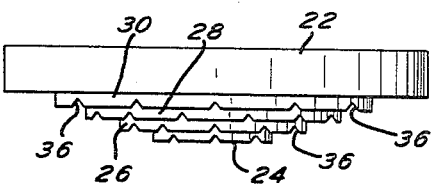
INVENTORS.
JOHN E. WALDRUM
RAYMOND J. ROBINSON
BY
Caesar, Rivise, Bernstein & Cohen
ATTORNEYS.

United States Patent Office 3,313,489
Patented Apr. 11, 1967

3,313,489
ROTATING LAWN SPRAYER NOZZLE HAVING DEPENDING CYLINDRICAL DEFLECTING SURFACES
John E. Waldrum, Ambler, and Raymond J. Robinson, Fort Washington, Pa., assignors to Amchem Products, Inc., Ambler, Pa., a corporation of Delaware
Filed Mar. 5, 1965, Ser. No. 437,420
7 Claims. (Cl. 239—223)

ABSTRACT OF THE DISCLOSURE

A lawn sprayer nozzle with several concentric circular spray walls of varying diameters extending in the downstream direction away from a base with discharge openings being located closely adjacent to the interior side of a particular spray wall so that when the base is rotated, the centrifugal force imparted to the material to be sprayed as it passes through a discharge opening will cause such material to be impelled against the interior side of a spray wall and then finally discharged from the outer edges of the spray wall to produce uniform particle size and a uniform spray pattern.

---

This invention relates to a lawn sprayer nozzle and has as its objective the provision of a new and improved device of this general class. The nozzle of the present invention may be utilized as a spray head in a centrifugal applicator for dispersing chemicals which may be either liquids, or free-flowing solids.

The nozzle of the present invention is so constructed that the discharge therefrom is in the form of uniform droplets of a size which may be varied by changing the diameter of the discharge openings. Where very viscous liquids carrying extremely active herbicides such as 2,4-dichlorophenoxyacetic acid and its derivatives are involved, the discharge openings may be relatively large so that the spray pattern consists of large droplets that will not drift. Except for the normal pressure associated with the head of the material to be dispensed that is being held in a storage tank associated with the lawn sprayer, there is a total absence of any additional pressure necessary for the functioning of the nozzle of the present invention.

It is a prime object of the present invention to provide a lawn sprayer nozzle of relatively simple construction which achieves all of the foregoing advantages and objectives and which is of a simple construction and relatively low cost.

The aforesaid objectives are achieved by providing a lawn sprayer nozzle that is basically comprised of a base having a plurality of spray walls extending therefrom in the downstream direction, the base further having a plurality of discharge openings therein, with the discharge openings being formed closely adjacent to a particular spray wall but being located on the interior side of the spray wall so that when the nozzle is rotated about an axis passing through its center point, the centrifugal force imparted to the liquid or solid being discharged will cause the same to be impelled against the interior side of the spray wall. This feature achieves a surprising uniformity in the size of the droplets in the spray pattern of the liquid being discharged from the nozzle. In a preferred form of the invention, notches are provided in the spray walls, although it is also contemplated that there may be pegs upstanding from the spray walls, the purpose of either the pegs or the notches being to hasten the separation of the solid being dispensed from the spray wall and to enhance uniformity of droplet size. The present invention also contemplates providing the spray walls in varying elevations or steps, and also beveling the tops of the spray walls to be inclined outwardly so that the liquid or solid emerging from the sprayhead will not bridge the gap between the adjacent spray walls, but instead will more readily pass from the top of the spray wall and away from the nozzle.

Other objects and many of the attendant advantages of the present invention will be readily appreciated as the same becomes better understood by reference to the following detailed description when considered in connection with the accompanying drawings wherein:

FIG. 1 is a fragmentary perspective view showing the top of the nozzle of the present invention operatively secured to the axle of a lawn sprayer and also showing certain features of the supply connections thereto;

FIG. 2 is a somewhat enlarged side elevational view of the nozzle of FIG. 1;

FIG. 3 is a front elevational view of the nozzle of FIG. 2;

FIG. 4 is a sectional view along the lines 4—4 of FIG. 3;

FIG. 5 is a view similar to FIG. 3 but wherein notches have been provided in the spray walls of the nozzle;

FIG. 6 is a sectional view similar to FIG. 4 showing notches in the spray walls of the nozzle;

FIG. 7 is a view similar to FIG. 6 but wherein pegs extend from the spray walls of the nozzle; and FIG. 8 is a schematic view on a reduced scale of a lawn sprayer incorporating the nozzle of the present invention.

Referring now to the various figures of the drawing wherein like reference characters refer to like parts, there is shown in FIG. 1 a lawn sprayer nozzle 10 of the present invention operatively secured to axle 12 of a lawn spraying device, and also showing supply connections 14 and support member 16. FIGS. 2, 3 and 4 show the details of the nozzle 10 which is basically comprised of a base 18 with cover 19 (FIG. 1) having an end annular section 20 with an upwardly extending flange 22. Depending in a downstream direction from the base 18 generally in a downstream direction are concentric spray walls 24, 26, 28 and 30 that have a common center point. A plurality of discharge openings 32 are formed in the base 18 closely adjacent to a particular spray wall. But the discharge openings are located on the interior side of the spray wall (the side closest to the center point).

As shown in FIGS. 2 and 4, the spray walls 24, 26, 28 and 30 are disposed in a stepped relationship with the innermost spray wall 24 extending the furthest away from the base 18 and then in declining order the spray walls 26, 28 and 30. This, however, is an optional feature whenever it is desired to insure that there will not be any bridging by the liquid being discharged between adjacent spray walls.

As further shown in FIG. 4, the tips of the spray walls may be beveled outwardly and away from the center point, such as the bevel 34 of FIG. 4. This is also optional whenever it is desired further to minimize the bridging of the liquid or solids being discharged from neighboring spray walls.

FIGS. 5 and 6 show a preferred embodiment of the invention wherein notches such as the V-shaped notches 36 of FIG. 6 may be formed in the various spray walls. The notches are not necessarily V-shaped, but may alternatively be U-shaped or in some irregular pattern depending upon the viscosity and surface tension of the material being sprayed, and upon other physical constant of the material being sprayed or upon the particular spray pressure.

Alternatively, as shown in FIG. 7, pegs 38 extending from the spray walls may be provided to avoid the bridging problem as previously mentioned in lieu of or in connection with either or both the notches 36 or the beveled tops 34.

As shown in FIG. 1, the upstream side of the nozzle 10 is provided with circular gear mechanism 40 which enables the nozzle 10 to be rotated through the rotation of rod 12. The mechanism 40 includes a pair of knurled spurs 41 and 42, with spur 42 being connected to rod 12 the ends of which are rotated by lawn sprayer wheels 44 that are in rolling contact with the ground. Thus, when the lawn sprayer 46 is pushed along the ground, the rotation of the wheels 44 is conveyed to the rod 12, and through the gears 40 and 42, the nozzle 10 is caused to rotate about the center point of base 18 and about an axis normal to the plane of base 18. As shown in FIG. 1, at least one bearing support 48 may be provided for the rod 12 with the nozzle 10 being also revolvably mounted in the bearing support 48. The support member 16 is provided with the lawn sprayer 46, and liquid or solid supply tank (not shown) may also form an integral part of the lawn sprayer 46. Supply connections 14 will lead the liquid or solids to main chamber 50 (FIG. 4) that lies between base 18 and cover 19 of the nozzle 10. Where solids are involved, special feeding means may have to be employed to deliver the solids to nozzle 10.

When the lawn sprayer 46 is moved along the ground, the nozzle 10 will rotate, and the material to be dispensed is fed to chamber 50 in order to have a centrifugal force imparted thereto as the material is about to pass through discharge openings 32 adjacent the interior side of a particular spray wall. The centrifugal force of rotation causes the liquid or solid being discharged to be impelled against the interior side of the immediate spray wall and then forced outwardly in a spray pattern composed of uniform droplets. The annular spaces between adjacent spray walls may be regarded as annular chambers wherein the aforesaid impelling action occurs with the actual spray pattern being initiated as soon as the material has passed immediately outwardly of the spray wall that is closely adjacent outwardly to a particular discharge opening from which the material emerged.

The various heights of the spray walls 24, 26, 28 and 30 will under certain circumstances enhance the uniformity of the spray pattern. Thus, the innermost spray wall 24 (the one closest to the center point) is at the greatest height so that material emerging from the discharge openings located just interiorly of the spray wall 24 will not come in contact with the remaining spray walls 26, 28 and 30. As can be readily seen, the aforesaid concept will apply in a similar fashion to the discharge openings located immediately interiorly of the spray walls 26, 28 and 30.

The provision of the notches 36 will tend to eliminate bridging of material between adjacent spray walls, even when the spray walls are of the same height. As also set forth herein, the tops of the spray walls may be beveled where it is necessary to take further steps to minimize bridging.

While the nozzle of the present invention has been discussed for use in connection with a lawn sprayer, it is obvious that it may also be incorporated into many known spray devices which utilize a rotating spray head or nozzle. The droplets in the spray pattern obtained utilizing the nozzle of the present invention are rendered uniform by virtue of the impelling action against the spray walls which is obtained for the reason set forth herein. The size and spacing of the discharge openings may, of course, be varied. For instance, if there are fewer discharge openings adjacent the center of the nozzle and more discharge openings around the outer edges thereof, a pattern would be obtained of spraying less material in the center of the swath and a considerably heavier coverage on the outer edges.

If nozzle of the present invention is fitted to a lawn sprayer, the width of the swath will be dependent on how fast the operator walks. When the operator walks faster, the spray nozzle will rotate faster. The pattern or density of the swath will depend, for the reasons previously discussed, upon the number of discharge openings in the nozzle and upon the number of concentric discharge openings in the nozzle. The present invention, however, is not necessarily limited to a circular configuration, but it is contemplated that the spray walls could be arranged in patterns other than circular, such as defining a rectangular or other polygonal area or in parallelism or inclined with respect to each other.

When a lawn spraying device is fitted with a nozzle of the present invention, it is easier to calibrate the spray rate of such a device. All that need be done is to observe visually the width of the swath. When a desirable width is obtained, there is reasonable certainty that the material is being applied on a uniform basis.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A lawn sprayer nozzle comprising a base with a central point, a plurality of vertically disposed concentric spray walls of varying diameters extending downstream from said base and being disposed about said central point, a plurality of vertically disposed discharge openings formed in said base, said discharge openings being formed closely adjacent to a particular spray wall but being located between said spray wall and said central point closely adjacent to the interior side of said spray wall, means for rotating the nozzle about an axis normal to the plane of the base and means to deliver material to be dispensed to said nozzle whereby the centrifugal force imparted to said material by virtue of the rotation of said nozzle will cause said material to be impelled against the interior side of a spray wall after passing through said discharge openings whereby a spray pattern is created having a substantially uniform particle size.

2. The invention of claim 1 wherein notches are provided in said spray walls.

3. The invention of claim 2 wherein said notches are V shaped.

4. The invention of claim 1 including upstanding pegs extending away from said spray walls.

5. The invention of claim 1 wherein said nozzle is of a circular configuration, and said spray walls are disposed in concentric circles about said central point.

6. The invention of claim 5 wherein the spray wall closest to the central point is the highest wall and each succeeding spray wall is successively lower in height.

7. The invention of claim 1 wherein the tips of the spray walls are inclined outwardly away from said central point in order to minimize bridging of the gap between adjacent spray walls by the material being dispensed.

References Cited by the Examiner

UNITED STATES PATENTS

| | | | |
|---|---|---|---|
| 1,149,810 | 8/1915 | Crosbie | 239—223 |
| 1,506,226 | 8/1924 | Dick | 239—224 |
| 1,751,531 | 3/1930 | Schars | 239—214 X |
| 1,962,781 | 6/1934 | MacLachlan | 239—224 |
| 2,369,216 | 2/1945 | Crisp | 239—223 |
| 3,144,209 | 8/1964 | Griffiths | 239—223 X |

FOREIGN PATENTS

| | | |
|---|---|---|
| 629,588 | 5/1936 | Germany. |
| 642,060 | 2/1937 | Germany. |
| 733,017 | 3/1943 | Germany. |
| 428,018 | 5/1935 | Great Britain. |

OTHER REFERENCES

Metz, Martin: German printed application No. 1,180,-284, published Oct. 22, 1964.

M. HENSON WOOD, Jr., *Primary Examiner.*

VAN V. WILKS, *Assistant Examiner.*